United States Patent [19]

Shizuya et al.

[11] Patent Number: 4,786,233
[45] Date of Patent: Nov. 22, 1988

[54] GAS TURBINE COOLED BLADE

[75] Inventors: Mitsutaka Shizuya, Hitachi; Kazuhiko Kawaike, Katsuta; Sadao Umezawa, Mito; Katsuo Wada, Hitachi; Nobuyuki Iizuka, Hitachi; Tomo Sato, Hitachi, all of Japan

[73] Assignee: Hitachi, Ltd., Tokyo, Japan

[21] Appl. No.: 5,239

[22] Filed: Jan. 20, 1987

[30] Foreign Application Priority Data

Jan. 20, 1986 [JP] Japan .................. 61-7926

[51] Int. Cl.⁴ .............................................. B63H 1/14
[52] U.S. Cl. ................... 416/97 R; 416/90 R; 416/96 R
[58] Field of Search ............. 416/90 R, 90 A, 96 R, 416/96 A, 97 R, 97 A

[56] References Cited

U.S. PATENT DOCUMENTS 4,416,585 11/1983 Adbel-Messeh ............... 416/97 R
4,514,144 4/1985 Lee .................................. 416/96 R

FOREIGN PATENT DOCUMENTS 34961 9/1981 European Pat. Off. ............. 416/97
0001804 1/1986 Japan ................................. 416/97 R
2112467 7/1983 United Kingdom ............. 416/97 R Primary Examiner—Robert E. Garrett
Assistant Examiner—Therese Newholm
Attorney, Agent, or Firm—Antonelli, Terry & Wands

[57] ABSTRACT

The penetrating members (21, 35, 37, 38, 39) are disposed inside the cooling passage (8) at positions so as to penetrate through the cooling passage (8), and have both of ends thereof fixed to the rear side wall (17) and the body side wall (18). The projecting members (33) (34A, 34B) are disposed inside the cooling passage (8) so as to project from the rear side wall (17) or the body side wall (18). The rectification ribs (36) are disposed at intermediate positions between the penetrating members (21, 35, 37, 38, 39) or the projecting members (33, 34A, 34B). The penetrating members (21, 35, 37, 38, 39) or the projecting members (33, 34A, 34B) disturbs the main stream (3a) of the cooling fluid (3) near the internal partition (19) in both directions of the leading edge wall (16) and the first internal partition (19) and make the main stream (3a) non-uniformly or causes its channelling.

17 Claims, 7 Drawing Sheets

GAS TURBINE COOLED BLADE

BACKGROUND OF THE INVENTION

The present invention relates to a gas turbine cooled blade and more particularly to an internal convectively cooled blade for a gas turbine. A leading edge cooling, particularly the cooling of an inner surface of a leading edge of the turbine blade, of a multipass convectively cooled gas turbine blade can be improved.

In a gas turbine, hot and high temperature combustion gas generated through a compressor and a combustor drives the gas turbine. With the improvement of engine thermal efficiency of the gas turbine in recent years, gas temperature now exceeds the heat resistance limit of the turbine hot components including turbine blades.

To cope with excessive thermal stress and corrosion generated in such a hot gas atmosphere, and to ensure sufficient mechanical strength and reliability, consistent improvements in heat-resistant alloys and coating materials and also in cooling technologies for the turbine hot components have been attempted.

Particularly because the turbine blade is directly exposed to the combustion gas and must have high cooling performance, an intricate cooling structure wherein the turbine blade is made hollow to form internal cooling passages and ejection holes to the outside and further cooling fluid such as a bleed from the compressor is introduced into both passages, has been employed.

In order to fully accomplish the high thermal efficiency by increasing gas temperature, an increase in total cooling flow rate that reduces the above efficiency significantly, especially an increase in the turbine blade cooling flow rate to which accounts for high percentage of cooling flow, must be minimized. Accordingly, various high performance gas turbine blades have been developed keeping pace with the improvement of blade fabrication techniques.

One of the typical gas turbine cooled blades is an impingement cooled blade disclosed in Japanese Patent Laid-Open No. 9623/1981. This impingement gas turbine cooled blade has a double structure consisting of a hollow blade main body and an insert body for cooling which is disposed in the cavity of the blade main body. The cooling fluid supplied into the cooling insert body flows through the jet ports of the surface and impinges against the inner surface of the turbine blade, thereby achieving high level of impingement cooling.

Though this impingement cooling structure of the gas turbine blade involves the disadvantage that the cooling insert body must be produced separately from the hollow blade main body, it has the advantage that the cooling performance for the turbine blade can be easily set in accordance with an external heat load distribution by adjusting the size and arrangement of the array of the jet ports, and it has high cooling performance for the gas turbine cooled blade on an average.

Another typical gas turbine cooled blade is a multipass convectively cooled blade disclosed, for example, in British Pat. No. 2112467 and United States Patent No. 4514144. In this gas turbine cooled blade, at least one structure of the cooling passage is defined inside the turbine blade in such a manner as to start from the root of the blade and to pass or extend and return in the direction of blade height. The cooling fluid flows along the inner surface of each blade wall, on which the projections and the pin fins for the heat transfer promotion are disposed, and cause increased forced convective cooling.

From the aspect of the blade fabrication techniques, this multipass convectively cooled structure of the gas turbine blades has the advantage that the blade main body and the most portions of the cooling passages can be molded all together by the precision casting, but it also involves the problem that adjustablity of the cooling performance in accordance with average cooling performance and the external heat load is lower than that of the impingement cooled blade.

Therefore, technical improvements inclusive of a new blade fabrication method have been attempted in order to improve the cooling performance for the gas turbine cooled blade by utilizing fully the heat transfer promotion elements or ribs and by miniaturizing the cooling passages.

Still another cooling structure of the gas turbine blades is a film cooling structure which injects a cooling fluid onto the blade surface to reduce the gas temperature on the external surface of the blade. However, this film cooling structure of the gas turbine blade is limited to apply to an airplane engine field or the like which uses a high quality oil free from plugging of the jet ports, and is therefore used conjointly with the cooling structure described above.

Since the following description is primarily directed to the cooling structure of the turbine bucket which can be adapted to low quality oil, the impingement cooled blade and the multipass convectively gas turbine cooled blade without the conjoint use of the film cooling structure will be examined.

In accordance with recent aerodynamic design of turbine blades, a blade outer shape having a smaller blade thickness than the conventional turbine blade has been employed in view of increasing aerodynamic performance, and the leading edge of the blade has an outer shape approximately to an ellipsis while the rear edge is made as thin as possible. In the moving blade, the aerodynamic design of each section is made in conformity with the difference of the flow conditions on the basis of the difference of a peripheral speed in the direction of blade height, so that the blade of the gas turbine is likely to have an outer shape which is twisted in the direction of blade height.

When a cooling design of the moving blade having the blade outer shape with excellent aerodynamic performance is made, cooling of the leading edge of the blade becomes particularly difficult if enough blade wall thickness is provided to ensure sufficient strength and reliability.

Fundamentally, this results from the fact that since the radius of curvature of the leading edge outer surface of the blade is relatively small, the external heat load increases and the heat transfer area ratio between the inner and the outer surfaces of the leading edge of the blade becomes small. It also exerts the following adverse influences upon each cooled blade.

Namely, in the case of the impingement gas turbine cooled blade, it is very difficult to design and mold the cooling insert body which is thinly twisted in conformity with the blade outer shape. Even if the blade outer shape is corrected at the sacrifice of the aerodynamic performance to some extent in order to have the cooling insert body insertive, the distance between the inner surface of the leading edge wall of the blade and the jet ports on the leading surface of the cooling insert body becomes too long and that causes reduction of the impingement cooling performance due to diffusion of the jet stream.

Therefore, from the aspects such as an aerodynamic performance, cooling performance and blade fabrication capability, the impingement cooled blade has both merit and demerit and the following multipass convectively cooled blade for the gas turbine is more generally used for practical application.

In the multipass convectively cooled blade for the gas turbine, the limitation of the aerodynamic design and the blade fabrication is not so severe, but the following problem occurs concerning the cooling design. Namely, inside the leading edge cooling passage having a roughly triangular section, the inner surface area of the leading edge of the blade reduces corresponding to the apex of an acute angle, the distribution of the cooling fluid to the inner surface of the leading edge wall decreases and the substantial flow velocity is comparatively low. Accordingly, the convective cooling performance of the multipass convectively cooled blade for the gas turbine cannot be improved even if the heat transfer promotion ribs are used.

The conventional multipass convectively cooled blade for the gas turbine described previously proposes also a method for improving the convective cooling by the heat transfer promotion ribs. British Pat. No. 2112467 uses slanting heat transfer promotion ribs on the rear side wall and body side wall towards the inner surface of the leading edge wall with respect to the flow and improves cooling of the inner surface of the leading edge wall by causing channelling. U.S. Pat. No. 4,514,144 defines spacings between the heat transfer promotion ribs disposed slantingly to the flow in order to promote heat transfer and reduce the fluid resistance.

However, the cooling improvement method for the turbine blades having these heat transfer promotion ribs primarily causes channelling and turbulence augmentation of the boundary layer of the cooling fluid in the proximity of the inner surface of the cooling fluid and promotes heat transfer, and its performance, particularly the performance when applied to the enhancement of cooling of the inner surface of the leading edge wall, is limited.

Accordingly, in the multipass convectively cooled blade for the gas turbine having less limitations from the aspects of the aerodynamic design and blade fabrication and being excellent in the overall evaluation, it is primarily the leading edge cooling passage that needs to be improved most essentially in order the further improve the cooling performance, particularly the cooling performance of the inner surface of its leading edge wall of the turbine blade.

SUMMARY OF THE INVENTION

An object of the present invention is to provide a gas turbine cooled blade wherein the cooling performance of the leading edge cooling passage of the multipass convectively cooled blade can be improved.

Another object of the present invention is to provide a gas turbine cooled blade wherein the cooling performance of the inner surface of the leading edge cooling passage of the multipass convectively cooled blade can be improved.

Still another object of the present invention is to provide a gas turbine cooled blade wherein the channelling and turbulence of the main stream of the cooling fluid can be concentrated upon the inner surface of the leading edge wall, and the cooling performance of this portion is improved effectively.

The above-described objects of the invention can be accomplished by disposing a plurality of extending members disposed inside the cooling passage at positions which are closer to the first internal partition than to the leading edge wall in such a manner as to face a flow of the cooling fluid and extending from at least one of the rear side wall and the body side wall.

The penetrating members or the projecting members as the above-mentioned extending members that penetrate or project in the leading edge cooling passage disturb the main stream of the cooling fluid near the first internal partition in both directions of the leading edge wall and the first internal partition and make the main stream of the cooling fluid non-uniform and cause its channelling. The channelling towards the first internal partition is not great because the penetrating members or the projecting members are arranged densely.

The projecting members are disposed inside the cooling passage at positions which are closer to the first internal partition than to the leading edge wall in such a manner as to face the flow of the cooling fluid and to project from the body side wall and have one of the ends thereof fixed to the body side wall. The projecting members project from the rear side wall and have one of the ends thereof fixed to to the rear side wall.

In another embodiment projecting members project from both of the rear side wall and the body side wall, and have one of the ends thereof fixed to the rear side wall or the body side wall, respectively.

The penetrating members either or the projecting members have a circular cross-sectional cylindrical shape or have an elliptic cross-sectional cylindrical shape. The penetrating members or the projecting members can have an elliptic cross-sectional shape including, for example, a blade-like cross-sectional cylindrical shape, and can be disposed slantingly in such a manner as to guide the flow of the cooling fluid to the leading edge wall.

The transverse cross-sectional area of the penetrating members is to set from 20% to 50% of the transverse cross-sectional area of the cooling passage, and the transverse cross-sectional area of the portion of the cooling passage towards the first internal partition is up to 20%. The length of the projecting members is at least 50% of the distance to the opposing surface.

According to this structure, the main stream of the cooling fluid, that otherwise merely passes through and does not much contribute to cooling of the inner surface of the leading edge wall of the blade in the prior art, can be utilized fully so that the width of adjustment of the convective cooling performance in accordance with an external heat load to each wall of the blade can be made greater and the cooling performance of the leading edge cooling passage of the internal convectively cooled blade as a whole can be improved.

However, since the section of the leading edge cooling passage approximates a triangle shape having its apex at the leading edge wall and its three sides on the rear side wall and body side wall and the first internal partition, the channelling towards the leading edge wall joins the boundary layer near the inner surfaces of the rear side wall and body side wall and is accelerated there as it flows near to the leading edge wall, and its turbulence is not much reduced.

Accordingly, the channelling and turbulence of the main stream of the cooling fluid of the leading edge cooling passage of of the multipass convectively cooled blade for the gas turbine caused by the penetrating members or the projecting members concentrates upon the inner surface of the leading edge wall, and the convective cooling performance of this portion is effectively improved.

The convective cooling performance of each wall other than the leading edge wall of the leading edge cooling passage of the multipass convectively cooled blade for the gas turbine is improved, too, by the channelling and turbulence, though not so much as the leading edge wall. Therefore, the cooling performance can be adjusted to a suitable cooling performance distribution corresponding to the external heat load of each wall, and the cooling performance of the leading edge cooling passage can be improved as a whole.

In the present invention, a plurality of rectification ribs are disposed at intermediate positions between the penetrating members or the projecting members adjacent to one another on a surface of the first internal partition and extend from the rear side wall.

The rectification ribs are disposed on the surface of the first internal partition corresponding to the intermediate positions of the adjacent cylindrical penetrating members or the adjacent columnar projecting members and decrease the channelling of the main stream due to the penetrating members or the projecting members in the direction towards the first internal partition. As a result, the channelling of the main stream of the cooling fluid increases in the direction towards the leading edge wall, the convective cooling performance of the inner surface of the leading edge wall is improved eventually and the heat transfer promotion of the first internal partition is restricted.

The degree of the channelling and turbulence concentrating upon the inner surface of the leading edge wall and the cooling performance the inner surface of the leading edge wall of the leading edge cooling passage of the multipass convectively cooled blade of the gas turbine depend upon the penetrating members or the projecting members and the shape of the passage such as its cross-sectional shape, but when set suitably, they can cause greater channelling and turbulence than those by the boundary layer by the conventional heat transfer promotion ribs. Further more, when used conjointly with the conventional heat transfer promotion ribs, they can provide a further greater cooling performance.

In accordance with the present invention, the cooling performance of the leading edge cooling passage of the multipass convectively cooled blade for the gas turbine can be improved, and particularly, the cooling performance of the inner surface of the leading edge wall can be improved effectively.

DETAILED DESCRIPTION OF PREFERRED EMBODIMENTS:

Hereinafter, preferred embodiments of the present invention will be described with reference to the accompanying drawings.

Embodiment 1

Figure 1:
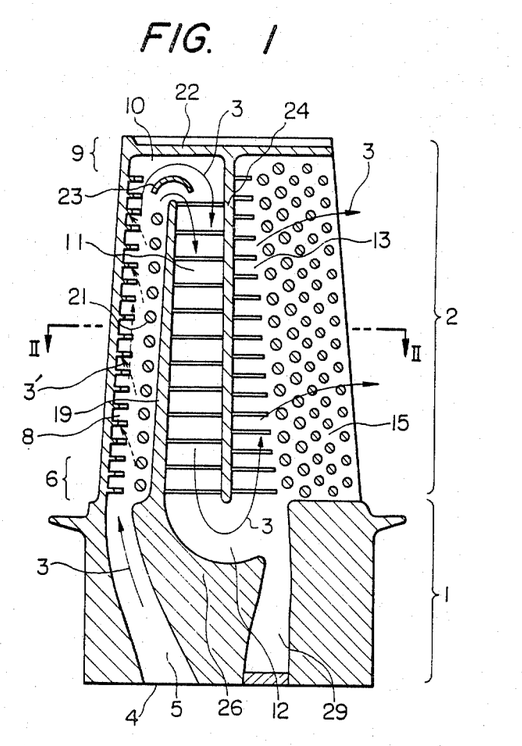
FIG. 1 is a longitudinal sectional view of a gas turbine cooled blade in accordance with first embodiment of the present invention.
Figure 2:
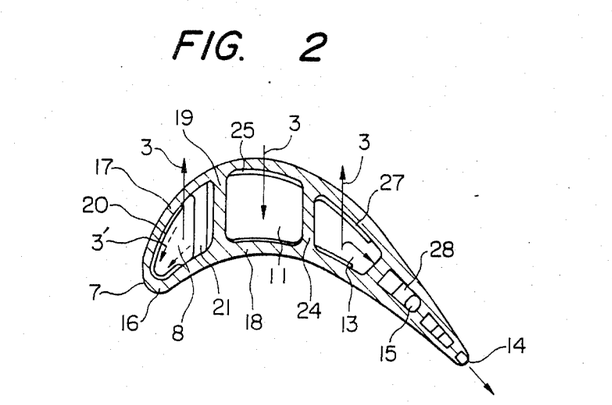
FIG. 2 is a transverse sectional view taken along line II—II of FIG. 1.

FIGS. 1 and 2 are a longitudinal sectional view of a multipass convectively cooled blade of a gas turbine in accordance with the present invention and a transverse sectional view taken along line II—II of FIG. 1.

The cooled blade of the gas turbine consists of an unitary structure of a shank portion 1 and a blade portion 2 that are coupled integrally in the direction of height of the blade, and a cooling passage structure is defined inside them. A cooling fluid 3 is supplied into a blade root 6 of the blade portion 2 from an inlet port 4 at the root of the shank portion 1 through an introduction passage 5 that penetrates through the interior of the unitary structure.

The cooling passage inside the blade portion 2 consists of a leading edge cooling passage 8, a first conversion passage 10, a center cooling passage 11, a second conversion passage 12, a rear half cooling passage 13, and a rear edge cooling passage 15.

The cooling passage consists of the leading edge cooling passage 8 that extends upward in the direction of height of the blade at the front half portion of the blade corresponding to the interior of a blade leading edge 7, the first conversion passage 10 positioned inside a blade tip 9, the center cooling passage 11 extending downward in the direction of height of the blade at the center portion of the blade, the second conversion passage 12 positioned inside the blade root 6 at the blade center, the rear half cooling passage 13 extending upward in the direction of height of the blade at the rear half portion of the blade and the rear edge cooling passage 15 branching continuously from the intermediate part of the rear half cooling passage 13 and communicating with a blade rear edge 14.

These passages 8, 10, 11, 12, 13 and 15 are communicated with one another in the order named above. The cooling fluid 3 flows through each passage 8, 10, 11, 12, 13 and 15 while causing convection and cooling, and is finally discharged outside from the blade rear edge 14.

The leading edge cooling passage 8 is divided by a leading edge wall 16, a rear side wall 17, a body side wall 18 and a first internal partition 19 that extends upward from the shank portion 1 in the direction of height of the blade. A plurality of heat transfer promotion ribs 20 are formed on the leading edge wall 16 and on the inner surface in the proximity of the leading edge wall 16. A plurality of cylindrical penetrating members 21 having an uniform circular cross-sectional shape are formed in the proximity of the first internal partition 19 with both ends thereof being integrated with the rear side wall 17 and body side wall 18, in such a manner as to oppose the flow of the cooling fluid 3. The cylindrical penetrating members 21 are disposed inside the leading edge cooling passage 8 at positions which are closer to the first internal partition 19 than to the leading edge wall 16 in such a manner as to face a flow of the cooling fluid 3. The heat transfer promotion ribs 20 and the cylindrical penetrating members 21 cause channelling and turbulence in the cooling fluid 3 and promote heat transfer.

The inner periphery of the first conversion passage 10 is divided by the tip of the first internal partition 19 while its outer periphery is divided by a blade tip wall 22. A conversion vane 23 for rectification is disposed inside the first conversion passage 10. The center cooling passage 11 is divided by the first internal partition 19, the rear side wall 17 and body side wall 18 and a second internal partition 24 extending downward in the direction of height of the blade from the blade tip wall 22. A plurality of heat transfer promotion ribs 25 are arranged on the inner surfaces of the rear side wall 17 and body side wall 18. The inner periphery of the second conversion passage 12 is divided by the tip of the second internal partition 24 and its outer periphery, by a root wall 26 of the first internal partition 19.

The rear half cooling passage 13 is divided by the second internal partition 24 and the rear side wall 17 and body side wall 18, and one of its ends communicates with the rear edge cooling passage 15. A plurality of heat transfer promotion ribs 27 are arranged on the inner surfaces of the rear side wall 17 and body side wall 18. The rear edge cooling passage 15 is provided with a plurality of pin fins 28 between rear side wall 17 and body side wall 18. An enhancement passage 29 penetrates through the rear half portion of the shank portion 1 and communicates with the second conversion passage 12. This corresponds to the enhancement portion of a ceramic core when the blade is precision-cast. Its root portion is sealed and is not used for the introduction of the cooling fluid 3.

Figure 3:
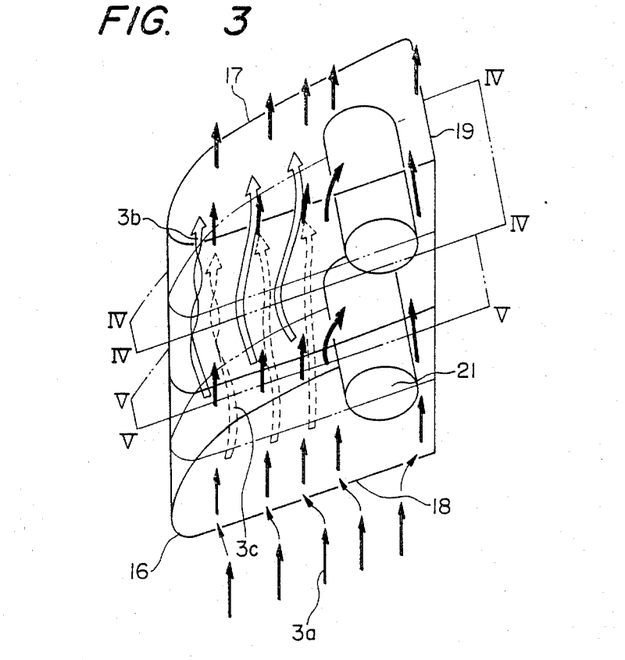
FIG. 3 is a partial perspective view showing schematically its leading edge cooling passage.
Figure 4:
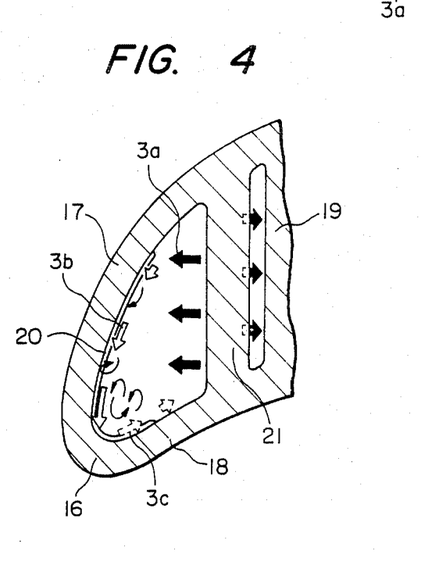
FIG. 4 is a partial transverse sectional view taken along plane IV—IV of FIG. 3.
Figure 5:
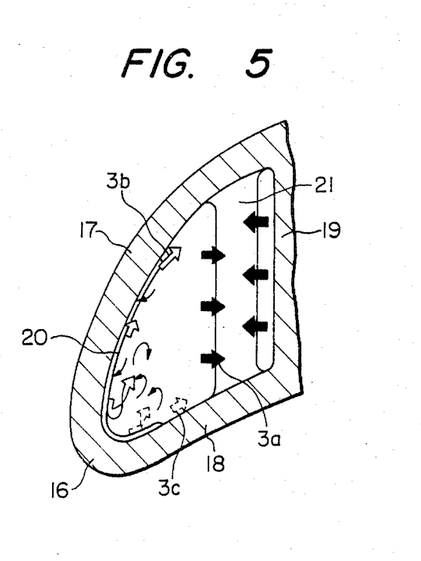
FIG. 5 is a partial transverse sectional view taken along plane V—V of FIG. 3.

The leading edge cooling passage 8 is shown in detail in FIGS. 3 to 5. FIG. 3 is a partial perspective view, and FIGS. 4 and 5 are partial transverse sectional views taken along plane IV—IV and along plane V—V of FIG. 3, respectively. FIG. 3 shows only the profile of the inner surface of each wall in order to simplify illustration, and the heat transfer promotion ribs 20 are omitted from the drawing. The main stream 3a of the cooling fluid 3 increases its convective cooling performance by the operation of the cylindrical penetrating members 21 extending or penetrating towards the first internal partition 19 while concentrating channelling and turbulence on the inner surface of the leading edge wall 16 in the following manner.

In the section of the leading edge cooling passage 8 in which the cylindrical penetrating members 21 shown in the plane IV—IV are contained, the main stream 3a of the cooling fluid 3 is diverted towards both sides by the cylindrical penetrating members 21. Since the cylindrical penetrating members 21 and the first internal partition 19 are close to one another, vigorous channelling occurs from the direction of the first internal partition 19 towards the direction of the leading edge wall 16.

When channelling that flows towards the leading edge wall 16 describes an acute angle with respect to the center axis of the cylindrical penetrating members 21 on the rear side wall 17 and an obtuse angle on the body side wall 18 as shown in FIG. 4, channelling 3b is formed on the back side inside the boundary layer from and along the inner surface of the rear side wall 17 towards the inner surface of the leading edge wall 16.

A channelling 3c is formed on the body side inside the boundary layer from and along the inner surface of the body side wall 18 and moves from the inner surface of the leading edge wall 16, and the channelling 3b on the back side is amplified and flows into the inner recessed surface of the leading edge wall 16.

In the section of the intermediate passage of the adjacent cylindrical penetrating members 21 on the plane V—V, on the other hand, channelling is in the opposite direction to the channelling described above and is smaller due to the main stream 3a of the cooling fluid 3. Since a slip stream region of a low velocity is formed between the densely arranged cylindrical penetrating members 21, the channelling in the opposite direction is smaller.

Accordingly, the high velocity channelling 3b on the back side along the inner surface of the leading edge wall 16 cannot change direction, swallows up the channelling 3c on the body side nearby and causes large turbulence at that portion. Since the channelling and turbulence concentrate upon the inner surface of the leading edge wall 16 in this manner, a large heat transfer promotion performance can be obtained. Turbulence is increased for the other wall inner surfaces when viewed as the passage as a whole, the heat transfer promotion performance can be obtained, though it is not so great as the heat transfer promotion performance on the inner surface of the leading edge wall 16.

Figure 6:
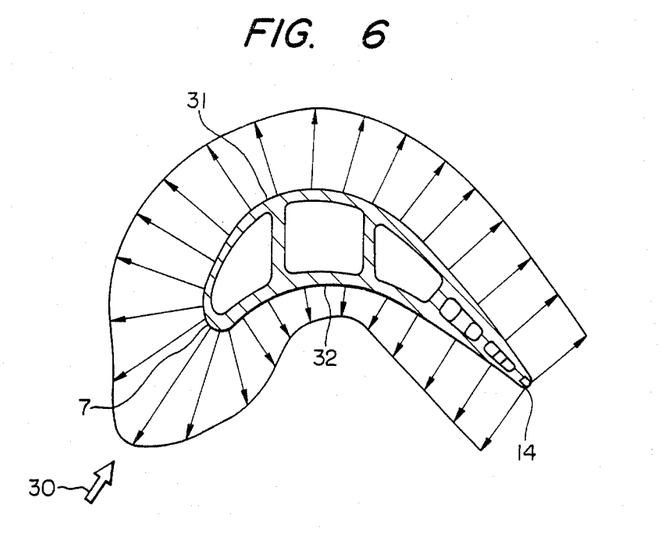
FIG. 6 is a diagram showing an external heat load distribution of a blade surface.

From FIG. 6 that shows the distribution of an external heat load on the blade surface of the turbine blade (which load is expressed as the product of a heat transfer ratio on the gas side and the difference between a gas temperature on the outer surface and a metal temperature on the outer surface), it can be seen that the external heat load is the greatest at the blade leading edge 7 which is the point of stagnation of the high temperature gas stream 30, is less on the back side 31 and least on the body side 32.

Among the blade walls of the leading edge cooling passage 8, the leading edge wall 16 has the smallest radius of curvature and the thickness of the blade wall must be above the minimum value determined for strength and reliability. Accordingly, the ratio of the internal and external heat transfer areas becomes the smallest there.

It can be understood from the description given above that the cooling performance required on each inner surface of the leading edge cooling passage 8 is particularly great on the leading edge wall 16, followed then by the rear side wall 17, the body side wall 18 and the first internal partition 19. As to the first internal partition 19, the adjustment is necessary lest superheating occurs and thermal stress becomes too great.

Obviously, the conditions described above can be satisfied when the present invention is applied as the heat transfer promotion method, as can be understood from the description of the first embodiment of the present invention.

Accordingly, it is possible in accordance with the first embodiment of the present invention to obtain a cooling passage structure which improves the cooling performance of the leading edge cooling passage 8 of the multipass convectively cooled blade for the gas turbine and particularly, makes it possible to attain the effective cooling performance of the inner surface of the leading edge wall 16.

Embodiment 2

Figure 7:
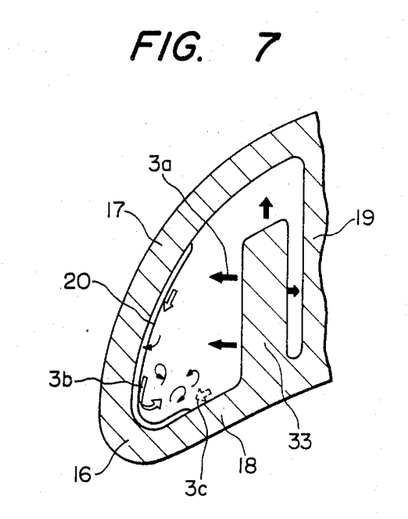
FIG. 7 is a partial transverse sectional view of the leading edge cooling passage of the gas turbine cooled blade in accordance with second embodiment of the present invention.

FIG. 7 is a partial transverse sectional view of the leading edge cooling passage of the gas turbine cooled blade equipped with columnar projecting members 33 as a second embodiment of the present invention.

In the second embodiment shown in FIG. 7, the columnar projecting members 33 having an uniform elliptic cross-sectional shape are fixed to the body side wall 18 and projects towards the rear side wall 17. The columnar projecting members 33 are disposed inside the leading edge cooling passage 8 at positions which are closer to the first internal partition 19 than to the leading edge wall 16 in such a manner as to face a flow of the cooling fluid 3.

Since the columnar projecting members 33 are not the cylindrical penetrating members 21 of the first embodiment of the present invention that connects the rear side wall 17 and the body side wall 18, the magnitude and direction of the channelling of the main stream $3a$ of the cooling fluid 3 change somewhat from those of the first embodiment of the present invention, but the enhancement performance of the convective cooling performance due to the concentration of the channelling and turbulence on the inner surface of the leading edge wall 16 is the same.

Embodiment 3

Figure 8:
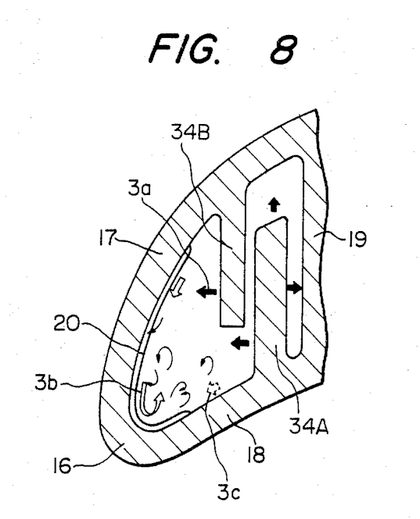
FIG. 8 is a partial transverse sectional view of the leading edge cooling passage of the gas turbine cooled blade in accordance with third embodiment of the present invention.

FIG. 8 is a partial transverse sectional view of the leading edge cooling passage of the gas turbine cooled blade equipped with two columnar projecting members 34A and 34B as a third embodiment of the present invention.

In the third embodiment shown in FIG. 8, a columnar projecting members 34A having an uniform elliptic cross-sectional shape projects from the body side wall 18 close to the opposed surface of the rear side wall 17 and another columnar projecting members 34B having an uniform elliptic cross-sectional shape projects from the rear side wall 17 close to the opposed surface of the body side wall 18. The columnar projecting members 34A are disposed inside the leading edge cooling passage 8 at positions which are closer to the first internal partition 19 than to the leading edge wall 16 in such a manner as to face a flow of the cooling fluid 3.

Since these columnar projecting members 34A and 34B are not the cylindrical penetrating members 21 of the first embodiment of the present invention that connects the rear side wall 17 and body side wall 18, the magnitude and direction of the channelling of the main stream $3a$ of the cooling fluid 3 change somewhat from those of the first embodiment of the present invention, but the enhancement performance of the convective cooling performance due to the concentration of the channelling and turbulence on the inner surface of the leading edge wall 16 is the same.

Embodiment 4

Figure 9:
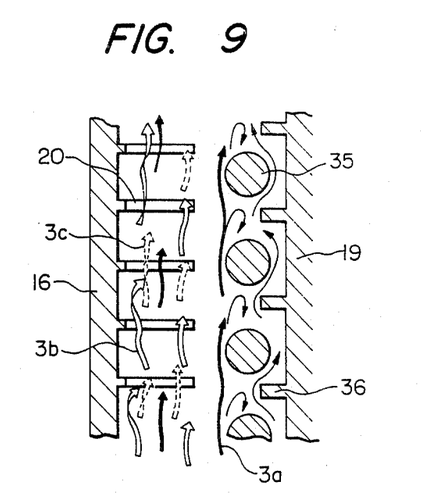
FIG. 9 is a partial longitudinal sectional view of the leading edge cooling passage of the gas turbine cooled blade in accordance with fourth embodiment of the present invention.

FIG. 9 shows a fourth embodiment of the present invention, and is a partial longitudinal sectional view of the leading edge cooling passage 8 of the gas turbine cooled blade.

In FIG. 9, a plurality of cylindrical penetrating members 35 having an uniform circular cross-sectional shape are shown disposed densely. The cylindrical penetrating members 35 are disposed inside the leading edge cooling passage 8 at positions which are closer to the first internal partition 19 than to the leading edge wall 16 in such a manner as to face a flow of the cooling fluid 3.

A plurality of rectification ribs 36 are formed on the surface of the first internal partition 19. These rectification ribs 36 are disposed on the surface of the internal partition 19 intermediate adjacent cylindrical penetrating members 35 and decrease the channelling of the main stream $3a$ of the cooling fluid 3 due to the cylindrical penetrating member 35 in the direction towards the first internal partition 19.

As a result, the channelling of the main stream $3a$ of the cooling fluid 3 increases in the direction towards the leading edge wall 16, the convective cooling performance of the inner surface of the leading edge wall 16 is improved consequently and the heat transfer promotion of the first internal partition 19 is restricted. Moreover, supercooling of the first internal partition 19, which has smaller heat load than the other blade walls, can be prevented.

Embodiment 5

Figure 10:
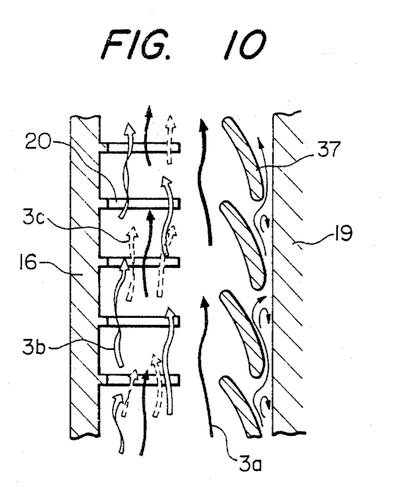
FIG. 10 is a partial longitudinal sectional view of the leading edge cooling passage of the gas turbine cooled blade in accordance with fifth embodiment of the present invention.

FIG. 10 shows a fifth embodiment of the present invention and is a partial longitudinal sectional view of the leading edge cooling passage 8 when the cylindrical penetrating members 37 have the blade-like cross-sectional shape. The cylindrical penetrating members 37 are disposed inside the leading edge cooling passage 8 at positions which are closer to the first internal partition 19 than to the leading edge wall 16 in such a manner as to face a flow of the cooling fluid 3.

In the fifth embodiment shown in FIG. 10, each cylindrical penetrating members 37 having the blade-like cross-sectional shape is disposed slantingly in such a manner as to guide the main stream 3a of the cooling fluid 3 toward the leading edge wall 16, so that the channelling of the main stream 3a of the cooling fluid 3 occurs more greatly in the direction of the leading edge wall 16 than in the direction of the first internal partition 19.

Therefore, in the same way as in the fourth embodiment of the present invention, the convective cooling performance of the inner surface of the leading edge wall 16 is imrroved and supercooling of the first internal partition 19 can be prevented.

Embodiment 6

Figure 11:
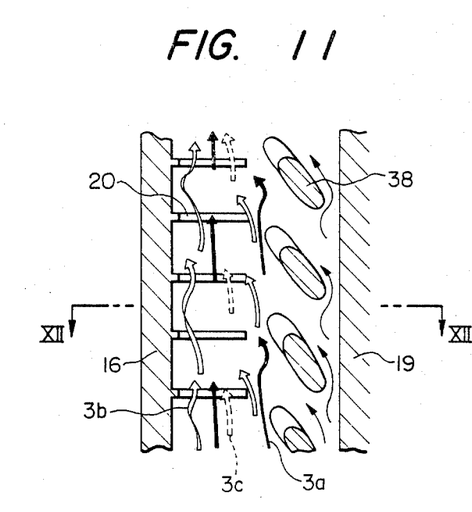
FIG. 11 is a partial longitudinal section view of the leading edge cooling passage of the gas turbine cooled blade in accordance with sixth embodiment of the present invention.
Figure 12:
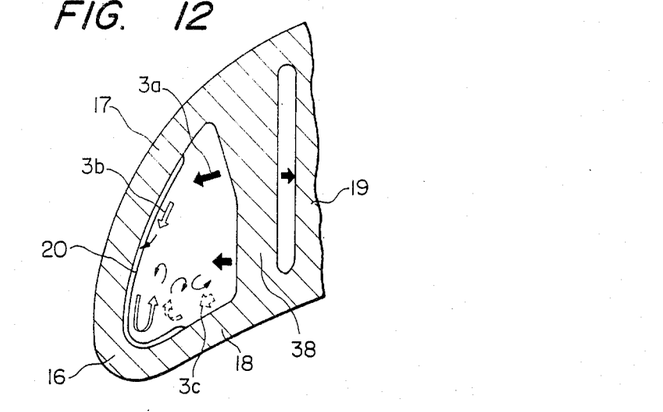
FIG. 12 is a partial transverse sectional view taken along line XII—XII of FIG. 11.

FIGS. 11 and 12 show a sixth embodiment of the present invention. FIG. 11 is a partial longitudinal sectional view of the leading edge cooling passage 8 when the cylindrical penetrating member 38 have an elliptic cross-sectional shape of varying size. FIG. 12 is a partial transverse sectional view taken along line XII—XII of FIG. 11. The leading edge cooling passage 8 of the gas turbine cooled blade whose cylindrical penetrating members 38 have a blade-like cross-sectional shape and cross-sections having varying sizes. The cylindrical penetrating members 38 are disposed inside the leading edge cooling passage 8 at positions which are closer to the first internal partition 19 than to the leading edge wall 16 in such a manner as to face a flow of the cooling fluid 3.

In the sixth embodiment shown in FIGS. 11 and 12, the cross-sectional shape of the cylindrical penetrating members 38 increases progressively towards the rear side wall 17, so that the channelling of the main stream 3a of the cooling fluid 3 in the direction of the leading edge wall 16 becomes greater towards the rear side. As a result, the channelling 3b on the rear side becomes great and the concentration of the channelling and turbulence on the inner surface of the leading edge wall 16 is more likely to occur, so that the cooling performance at this portion is enhanced.

Embodiment 7

Figure 13:
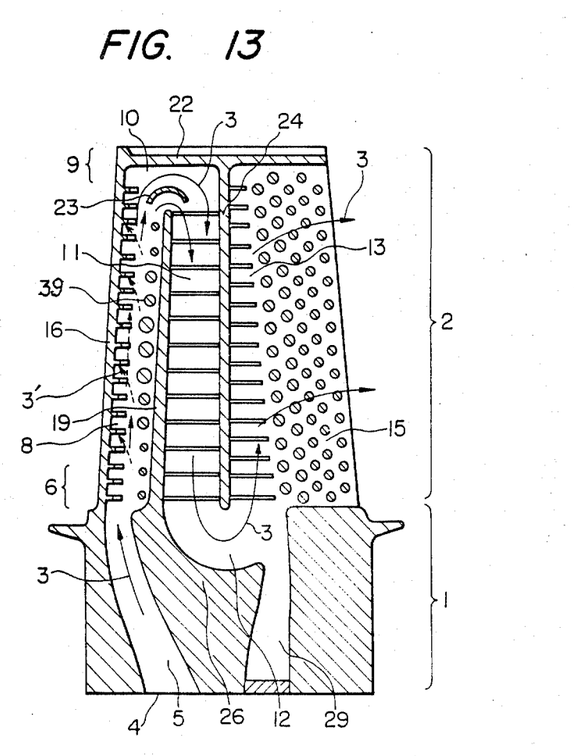
FIG. 13 is a longitudinal sectional view of a gas turbine cooled blade in accordance with seventh embodiment of the present invention.

FIG. 13 is a longitudinal sectional view of the gas turbine cooled blade in accordance with a seventh embodiment of the present invention. In the seventh embodiment shown in FIG. 13, the cross-sectional sizes of the cylindrical penetrating members 39 having an uniform circular cross-sectional shape change in the direction of the blade height and become maximal at the center. The cylindrical penetrating members 39 are disposed inside the leading edge cooling passage 8 at positions which are closer to the first internal partition 19 than to the leading edge wall 16 in such a manner as to face a flow of the cooling fluid 3.

Accordingly, the degree of the channelling 3' of the cooling fluid 3 becomes great at the center in the direction of the blade height, and the cooling performance of the inner surface of the leading edge wall 16 exhibits the same distribution.

Figure 14A:
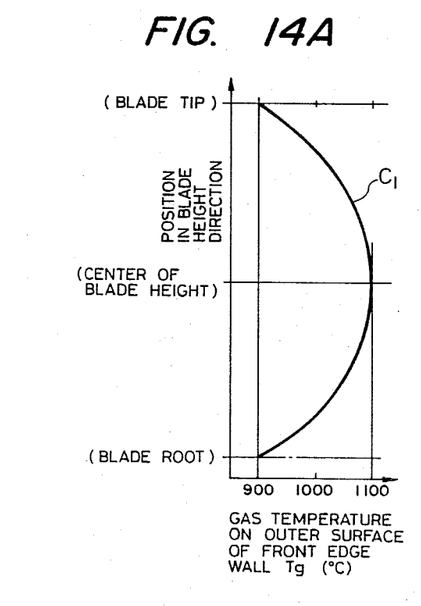
FIG. 14A is a diagram showing the distribution of an external surface gas temperature of the leading edge wall along the leading edge cooling passage of the gas turbine blade.
Figure 14B:
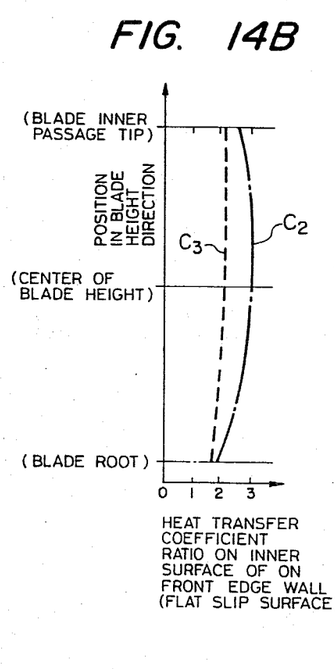
FIG. 14B is a diagram showing the distribution of an internal surface head transfer ratio of the leading edge wall along the leading edge cooling passage of the gas turbine blade.
Figure 14C:
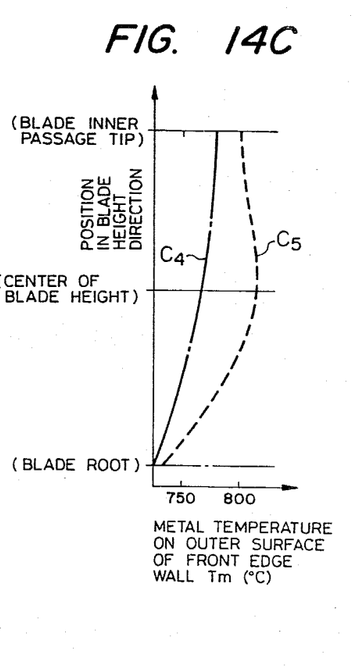
FIG. 14C is a diagram showing the distribution of an external surface metal temperature of the leading edge wall along the leading edge cooling passage of the gas turbine blade.

FIGS. 14A, 14B and 14C are diagrams showing the distribution of each of the outer surface gas temperature, the inner surface heat transfer ratio and outer surface metal temperature of the leading (front) edge wall 16 along the leading (front) edge cooling passage 8 corresponding to the seventh embodiment shown in FIG. 13, respectively.

The gas temperature curve $C_1$ on the external surface of the blade leading edge in the direction of blade height tends to become higher at the center than at the blade tip 9 and the blade root 6, as shown in FIG. 14A. The adjustment is preferably made so that the cooling performance of the inner surface of the leading edge cooling passage 8 becomes maximal at the center in the direction of blade height in order to make the blade wall temperature uniform.

When the seventh embodiment shown in FIG. 13 is applied, the heat transfer ratio curve $C_2$ of the inner surface of the leading edge wall 16, that is, the cooling performance, has the distribution described above, as represented by one-dot-chain line of FIG. 14B, while the heat transfer ratio curve $C_3$ of the inner surface of the leading edge wall 16 having no cylindrical penetrating members shows as represented by dash lines.

As a result, the outer surface temperature curve $C_4$ of the leading edge shown on FIG. 14C has an almost uniform distribution which increases progressively in the direction of blade height with the seventh embodiment. FIGS. 14B and 14C show also the heat transfer ratio distribution $C_3$ and the outer surface temperature distribution $C_5$ by dash lines when the cylindrical penetrating members are not used.

It can be understood from the diagrams that the present invention can optimize the cooling performance in the section of the leading edge cooling passage 8, and the cooling performance in the direction of blade height exhibits a desirable tendency.

Figure 15:
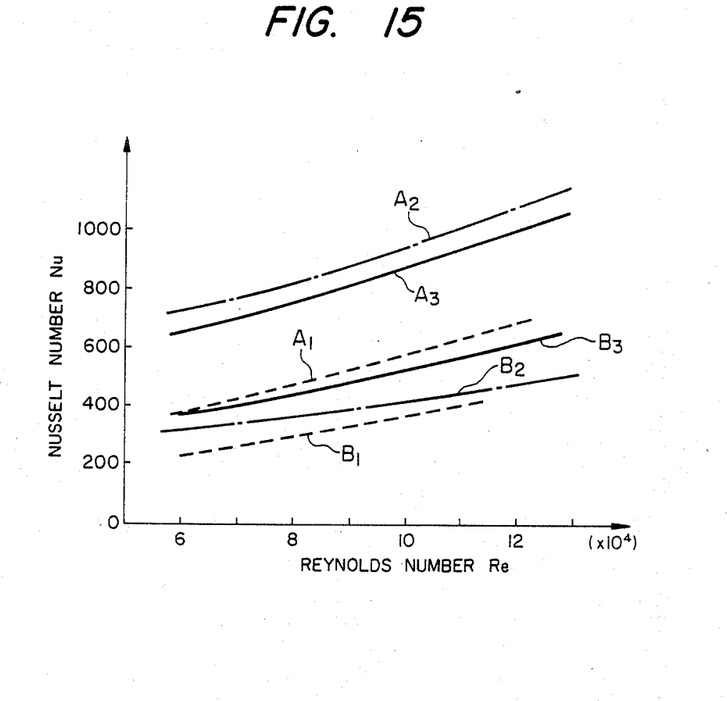
FIG. 15 is a diagram showing the Nusselt number of each surface of the leading edge cooling passage of the gas turbine blade in accordance with and without penetrating members as a function of Reynolds number based upon a model heat transfer test.

FIG. 15 shows the result of actual measurement of the difference of Nusselt number of each surface of the leading edge cooling passage 8, due to the existence and absence of the cylindrical penetrating members, as a function of the Reynolds number of the cooling passage by a model heat transfer test.

In FIG. 15, curves A1, A2, A3 represent the inner surface of the leading edge wall and the curves B1, B2, B3 represents the inner surface of the internal partition wall, respectively.

FIG. 15 shows the Nusselt numbers corresponding to the cooling performance of the inner surfaces of the leading edge wall represented by curve A and the first internal partition represented by curve B1 where no cylindrical penetrating members exists but only the heat transfer promotion ribs are disposed compared with the embodiment represented by curves A2, B2 where the cylindrical penetrating members having the elliptical cross-sectional shape and the rectification ribs on the first internal partition are disposed in combination and also with the embodiment represented by curves A3, B3 where the cylindrical penetrating members having the circular cross-sectional shape and the rectification ribs on the first internal partition are disposed in combination.

In comparison with the situation represented by curve A1 where no cylindrical penetrating members are disposed, when cylindrical penetrating members are provided in accordance with the present invention, the Nusselt number increases by about 200 on the inner surface of the leading edge wall and about 100 on the inner surface of the first internal partition, and their ratio increases to 2:1.

When the cylindrical penetrating members have the elliptic cross-sectional shape as depicted by the curves A2, B2, the ratio of the inner surface of the leading edge wall to the inner surface of the first internal partition becomes greater than when the cylindrical penetrating members have the circular cross-sectional shape as depicted by the curves A3, B3. It can be thus understood that enhancement of cooling of the leading edge wall and prevention of supercooling of the first internal partition are simultaneously satisfied and the cooling performance of the leading edge cooling passage can be improved more effectively.

In the test cooled blade of the gas turbine described above, the proportion of each portion to the transverse sectional area of the leading edge cooling passage is 30% for the cylindrical members, 20% for the portion of the passage close to the first internal partition and 50% for the portion of the passage close to the leading edge wall. It is assumed from the result described above that the suitable ranges of the ratios are 20 to 50%, up to 20% and 30 to 60%, respectively, in order to improve the cooling performance.

In the case of the columnar projecting members, its length is such that the columnar projecting members can interface the main stream of the cooling fluid, and must be at least 50% of the distance to the opposed surface.

We claim:

1. A gas turbine cooled blade having a cooling passage of an internal convective cooling arrangement which is defined by a leading edge wall, a suction side wall and a pressure side wall of a blade leading edge region, a first internal; partition and a plurality of extending members disposed inside said cooling passage and extending from at least one of said suction side wall and said pressure side wall facing a flow of a cooling fluid, said extending members being arranged densely in a line and being positioned closer to said first internal partition than to said leading edge wall in such a manner so as to oppose the flow of the cooling fluid, thereby concentrating channelling and turbulence of a main stream of the cooling fluid upon an inner surface of said leading edge wall, and to increase cooling performance at said leading edge wall beyond cooling performance at said first internal position.

2. A gas turbine cooled blade having a cooling passage of an internal convective cooling arrangement which is defined by a leading edge wall, a suction side wall, a pressure side wall of a blade leading edge region, a first internal partition and a plurality of penetrating members disposed inside said cooling passage and extending from at least one of said suction side wall and said pressure side wall facing a flow of a cooling fluid, and said members being arranged densely in a line and being positioned closer to said first internal partition than to said leading edge wall in such a manner as to oppose the flow of the cooling fluid, thereby concentrating channelling and turbulence of a main stream of the cooling fluid upon an inner surface of said leading edge wall to incresase cooling performance at said leading edge wall above cooling performance at said first internal partition, and each of said penetrating members having both ends thereof fixed to said suction side wall and said pressure side wall.

3. A gas turbine cooled blade according to claim 2, wherein said penetrating members have one of a circular and elliptic cross-sectional cylindrical shape.

4. A gas turbine cooled blade according to claim 2, wherein said penetrating members have one of an elliptic and a blade-like cross-sectional cylindrical shape, and are disposed slantingly to guide the flow of said cooling fluid to said leading edge wall.

5. A gas turbine cooled blade having a cooling passage of an internal convective cooling arrangement which is defined by a leading edge wall, a suction side wall and a pressure side wall of a blade leading edge region and by a first internal partition, and a plurality of projecting members disposed inside said cooling passage and extending from at least one of said suction side wall and said pressure side wall facing a flow of a cooling fluid, and said members being arranged densely in a line and being positioned closer to said first internal partition than to said leading edge wall in such a manner as to oppose the flow of the cooling fluid, thereby concentrating channelling and turbulence of a main stream of the cooling fluid upon an inner surface of said leading edge wall and increasing cooling performance at said leading edge wall above cooling performance at said first internal partition and to project from at least one of said suction side wall and said pressure side wall, and each of said projecting members having at least one of the ends thereof fixed to said suction side wall and said pressure side wall.

6. A gas turbine cooled blade according to claim 5, wherein said projecting membr has one of a circular and an elliptic cross-sectional columnar shape.

7. A gas turbine cooled blade according to claim 5 wherein said projecting member has one of an elliptic and a blade-like cross-sectional columnar shape, and is disposed slantingly to guide the flow of said cooling fluid to said leading edge wall.

8. A gas turbine cooled blade having a cooling passage of an internal convective cooling arrangement which is defined by a leading edge wall, a suction side wall and a pressure side wall of a blade leading edge region and by a first internal partition.

and a plurality of projecting members disposed inside said cooling passage and extending from at least one of said pressure side wall of a blade leading edge region and by a first internal partition, and a plurality of projecting members disposed inside said cooling passage and extending from at least one of said suction side wall and said pressure side wall facing a flow of a cooling fluid, and said members being arranged densely in a line and being positioned closer to said first internal partition than to said leading edge wall in such a manner as to oppose the flow of the cooling fluid, thereby concentrating channelling and turbulence of a main stream of the cooling fluid upon an inner surface of a main stream of the cooling fluid upon an inner surface of said leading edge wall and increasing cooling performance at said leading edge wall above cooling performance at said first internal partition and to project from said body side wall, and each member having one of the ends thereof fixed to said pressure side wall.

9. A gas turbine cooled blade having a cooling passage of an internal convective cooling arrangement which is defined by a leading edge wall, a suction side wall and a pressure side wall of a blade leading edge region and by a first internal partition, and a plurality of projecting members disposed inside said cooling passage and extending from at least one of said suction side wall and said pressure side wall facing a flow of cooling fluid, and said members being arranged densely in a line and being positioned closer to said first internal partition than to said leading edge wall in such a manner as to oppose the flow of the cooling fluid, thereby concentrating channelling and turbulence of a main stream of the cooling fluid upon an inner surface of said leading edge wall and increasing cooling performance at said leading edge wall above cooling performance at said first internal partition and to project from both of said suction side wall and said pressure side wall, and said members having at least one of the ends thereof fixed to said suction side wall and said pressure side wall, respectively.

10. A gas turbine cooled blade having a cooling passage of an internal convective cooling arrangement defined by a leading edge wall, a suction side wall, a pressure side wall of a blade leading edge region, and a first internal partition, and a plurality of penetrating members disposed inside said cooling passage and extending from at least one of said suction side wall and said pressure wall facing a flow of a cooling fluid, and said members being arranged densely in a line and being positioned closer to said first internal partition than to said leading edge wall to oppose the flow of the cooling fluid, thereby concentrating channelling and turbulence of a main stream of the cooling fluid upon an inner surface of said leading edge.

11. A gas turbine blade having a cooling passage of an internal convective cooling arrangement which is defined by a leading edge wall, a suction side wall, a pressure side wall of a blade leading edge region, a first internal partition,
and a plurality of penetrating members disposed inside said cooling passage and extending from at least one of said suction side wall and said pressure side wall facing a flow of a cooling fluid, and said members being arranged densely in a line and being positioned closer to said first internal partition than to said leading edge wall in such a manner as to oppose the flow of the cooling fluid, thereby concentrating channelling and turbulence of a main stream of the cooling fluid upon an inner surface of said leading edge wall, and each of said penetrating members having both ends therof fixed to said suction side wall and said pressure side wall,
wherein the transverse cross-sectional area of said penetrating members is from 20% to 50% of the transverse cross-sectional area of said cooling passage and the transverse cross-sectional area of the portion of said cooling passage between said members and said first internal partition is up to 20% of the transverse cross-sectional area of said cooling passage.

12. A gas turbine cooled blade having a cooling passage of an internal convective cooling arrangement which is defined by a leading edge wall, a suction side wall and a pressure side wall of a blade leading edge region and by a first internal partition,
and a plurality of projecting members disposed inside said cooling passage and extending from at least one of said suction side wall and said pressure side wall facing a flow of a cooling fluid, and said members being arranged densely in a line and being postioned closer to said first internal partition than to said leading edge wall in such a manner as to oppose the flow of the cooling fluid, therby concentrating channelling and turbulence of a main stream of the cooling fluid upon an inner surface of said leading edge wall and to project from at least one of said suction side wall and said pressure side wall, and each of said projecting members having one of the ends thereof fixed to said suction side wall and said pressure side wall, wherein the length of said projecting is at least 50% of the distance to the opposed surface.

13. A gas turbine cooled blade having a cooling passage of an internal convective cooling arrangement which is defined by a leading edge wall, a rear side wall, a body side wall of a blade leading edge region, a first internal partition
and a plurality of penetrating members disposed inside said cooling passage and extending from at least one of said rear side wall and said body side wall facing a flow of a cooling fluid, and said members being arranged densely in a line and being positioned closer to said first internal partition than to said leading edge wall in such a manner as to oppose the flow of the cooling fluid, thereby concentrating channelling and turbulence of main stream of the cooling fluid upon an inner surface of said leading edge wall and said members having both ends therof fixed to said rear side wall and said body side wall, and a plurality of rectifiction ribs being disposed at positions in an area adjacent and said penetrating members and adjacent to one another on a surface of said first internal partition and extending from said rear side wall.

14. A gas turbine cooled blade having a cooling passage of an internal convective cooling arrangement which is defined by a leading edge wall, a rear side wall, a body side wall of a blade leading edge region, a first internal partition
and a plurality of projecting members disposed inside said cooling passage and extending from at least one of said rear side wall and said body side wall facing a flow of a cooling fluid, and said members being arranged densely in a line and being positioned closer to said first internal partition in such a manner as to oppose the flow of the cooling fluid, thereby concentrating channelling and turbulence of a main stream of the cooling fluid upon an inner surface of said leading edge wall and to project from at least one of said rear side wall and said body side wall and said members having one of the ends thereof fixed to said rear side wall or said body side wall, and a plurality of rectification ribs disposed at positions in an area adjacent and between said projecting members and adjacent to one another on a surface of said first internal partition and extending from said rear side wall.

15. A gas turbine cooled blade having cooling passage means for internal convective cooling of said blade, said cooling passage means comprising in the leading edge region a leading edge wall, a rear side wall, a body side wall, and an internal partition, and means disposed in a line along a direction of main stream flow of a cooling fluid, and closer to said internal partition than to said leading edge wall, in said cooling passage means to cool said blade by internal convective than to said leading edge wall for opposing the flow of the cooling fluid and thereby concentrating channelling and turbulence of the main stream of the cooling fluid upon an inner surface of said leading edge wall while restraining cooling of said internal partition,
wherein the flow opposing means are arranged densely in the line along the cooling fluid main stream flow, and
said flow opposing means have cross-sectional areas which increase to a maximum at around the center of blade height and decrease in the direction of the blade root and of the blade tip.

16. A gas turbine cooled blade having cooling passage means for internal convective cooling of said blade, said cooling passage means comprising in the leading edge region a leading edge wall, a rear side wall, a body side wall, and an internal partition, and means disposed in a line along a direction of main stream flow of a cooling fluid, and closer to said internal partition than to said leading edge wall, in said cooling passage means to cool said blade by internal convective than to said leading edge wall for opposing the flow of the cooling fluid and thereby concentrating channelling and turbulence of the main stream of the cooling fluid upon an inner surface of said leading edge wall while restraining cooling of said internal partition, wherein the flow opposing means are arranged densely in the line along the cooling fluid main stream flow, and said flow opposing means have cross-sectional areas in the direction transverse to blade height of between 20% to 50% of an area of said cooling passage means transverse to blade height, and the area of the cooling passage means between said flow opposing means and said internal partition is up to 20% of the area of said cooling passage means.

17. A gas turbine cooled blade having cooling passage means for internal convective cooling of said blade, said cooling passage means comprising in the leading edge region a leading edge wall, a rear side wall, a body side wall, and an internal partition, and means disposed in a line along a direction of main stream flow of a cooling fluid, and closer to said internal partition than to said leading edge wall, in said cooling passage means to cool said blade by internal convective than to said leading edge wall for opposing the flow of the cooling fluid and thereby concentrating channelling and turbulence of the main stream of the cooling fluid upon an inner surface of said leading edge wall while restraining cooling of said internal partition, wherein the flow opposing means are arranged densely in the line along the cooling fluid main stream flow, and said flow opposing means have a length in the direction between the rear side wall and body side wall of at least 50% of the distance therebetween.

* * * * *